United States Patent [19]

Fisher

[11] 3,912,335
[45] Oct. 14, 1975

[54] TRACK TENSIONING MECHANISM
[75] Inventor: George A. Fisher, Mentor, Ohio
[73] Assignee: General Motors Corporation, Detroit, Mich.
[22] Filed: Nov. 11, 1974
[21] Appl. No.: 522,480

[52] U.S. Cl. .................................. 305/10; 305/31
[51] Int. Cl.² ........................................ B62D 55/00
[58] Field of Search ............. 305/10, 31, 32; 92/63, 92/16 B

[56] References Cited
UNITED STATES PATENTS
2,837,380   6/1958   Mazzarins ............................. 305/10
3,841,715  10/1974   Comer .................................. 305/10

Primary Examiner—Philip Goodman
Assistant Examiner—John A. Carroll
Attorney, Agent, or Firm—Edward J. Biskup

[57] ABSTRACT

A track tensioning mechanism for a crawler tractor that has one end connected to an idler wheel and the other end connected to the frame of the tractor and is characterized by having relatively movable piston and cylinder members with the piston member formed with a double headed member that divides the cylinder member into three chambers, two of which are filled with a compressible fluid at a predetermined pressure while the third is adapted to be filled with an incompressible fluid. The piston member carries a plunger which together with the rod portion of the piston member forms a closed chamber which is also adapted to be filled with an incompressible fluid for adjusting the length of the mechanism.

3 Claims, 3 Drawing Figures

TRACK TENSIONING MECHANISM

This invention relates to track adjusting mechanisms and more particularly to a track tensioning mechanism for adjusting the tension on the endless track of a track-laying vehicle.

Various devices have been used for tensioning the track of a crawler tractor that also operate a recoil mechanisms for absorbing shock loads on the track when rocks or other obstructions lodge between the track and the idler wheel or drive sprocket. Under such conditions, the idler wheel moves rearwardly against the pressure of a spring device until the obstruction has been dislodged and thereupon returns forwardly in response to the spring pressure. While this type of tensioning mechanism is adequate under normal conditions of operations, numerous problems arise in connection therewith among which is the difficulty encountered in maintaining an adequate tension force on the track after taking up track slack resulting from normal wear of the track linkage.

Accordingly, the objects of the present invention are to provide a new and improved track adjusting device which allows the dimensional length of the device to be increased for taking up the slack of an endless track of a crawler tractor while maintaining a predetermined spring force for shock absorbing purposes; to provide a new and improved track tensioning mechanism having a pair of concentric and relatively telescoping type members each of which is adjustable relative to a fixed cylinder member for tensioning an endless track of a crawler tractor; and to provide a new and improved idler wheel positioning mechanism that has a self-contained accumulator that can be maintained at a predetermined pressure and that is adjustable in length for tensioning the track of a crawler tractor by adding an incompressible fluid to the mechanism.

The above objects and others are realized in accordance with the invention by a track tensioning mechanism that is connected to the frame of a crawler tractor at one end and to an idler wheel at the other end. The mechanism comprises a cylinder member and a relatively movable piston member, the latter of which has one end thereof provided with a pair of axially spaced piston heads that serve to divide the cylinder member into three chambers while the other end has a rod portion which normally extends out of the cylinder member. Two of the chambers adjacent the base end of the cylinder member communicate with each other and are filled with a compressible fluid such as nitrogen at a predetermined pressure. The third chamber is located at the head end of the cylinder member and is adapted to be charged with an incompressible fluid such as grease to limit forward movement of the piston member and under certain conditions, to receive additional grease so as to maintain the nitrogen at a predetermined pressure. The rod portion of the piston member has an elongated dead and cylindrical bore formed therein along its longitudinal axis. A plunger is slidably located within the bore and forms a closed chamber therewith. The latter mentioned closed chamber is adapted to receive an incompressible fluid such as grease so as to cause the plunger to be moved outwardly relative to the rod portion so as to increase the dimensional length of the mechanism and thereby adjust the tension of the endless track while maintaining the predetermined pressure of the nitrogen in the base end of the cylinder member.

A more complete understanding of the subject invention will be derived from the following detailed description when taken with the drawings in which.

Figure 3:
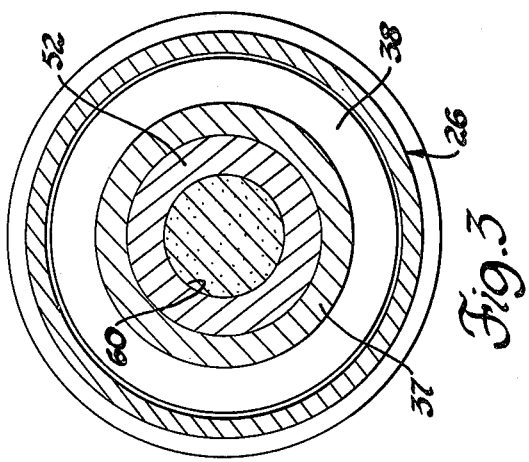
FIG. 3 is a sectional view taken on lines 3—3 of FIG. 2.
Figure 1:
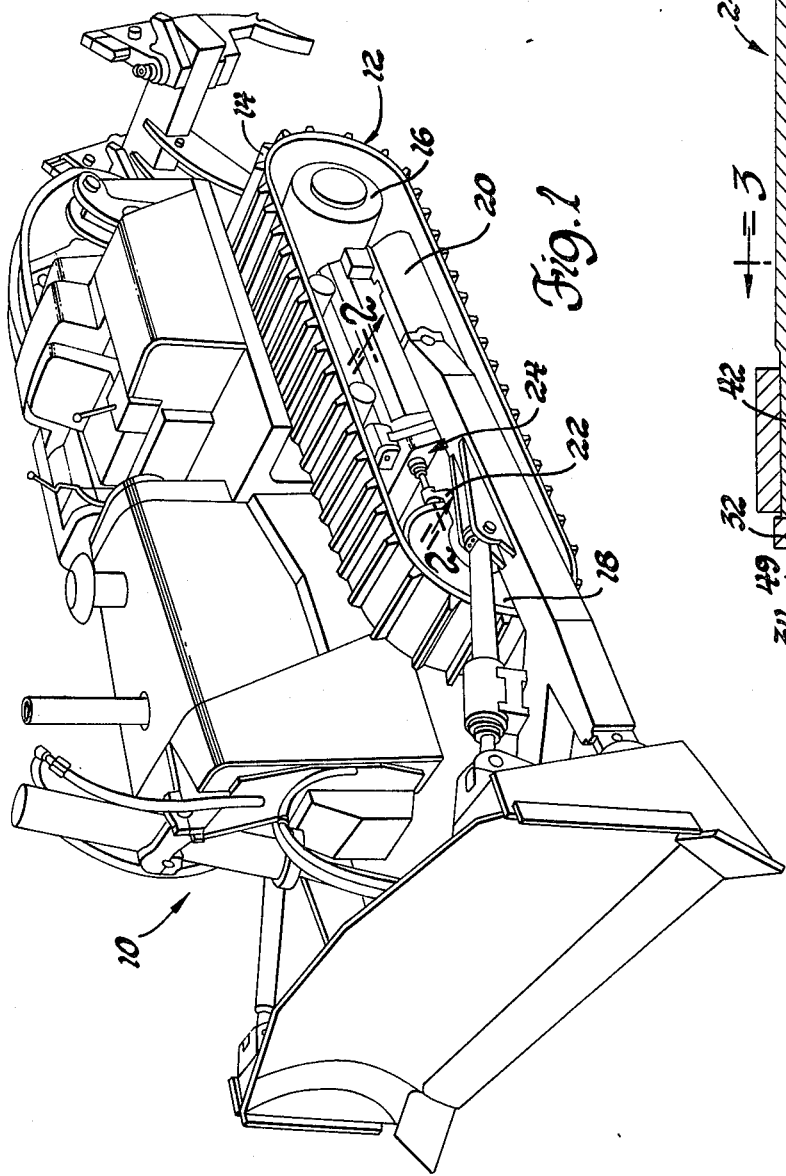
FIG. 1 is a perspective view of a crawler tractor incorporating an adjusting mechanism made in accordance with the invention.

Referring to the drawings and more particularly FIG. 1, a crawler tractor 10 is illustrated having two self-laying endless track units 12 at the opposite sides thereof. While only one side of the vehicle is shown, it will be understood that the opposite side is identical in structure and that the description given with reference to the left side applies equally to the right side.

Each self-laying track unit 12 comprises an endless track 14 which extends around and engages a sprocket drive wheel 16 at the rear of the vehicle and an idler wheel 18 supported by a track roller frame 20 at the front of the vehicle. the drive wheel 16 is operatively connected with the vehicle power plant, not shown, and is adapted to propel the endless track 14 in a conventional manner. The idler wheel 18 is rotatably mounted at the forward end of the track roller frame 20 and is attached for fore and aft sliding movement to provide tensioning of the endless track during operation of the vehicle.

Figure 2:
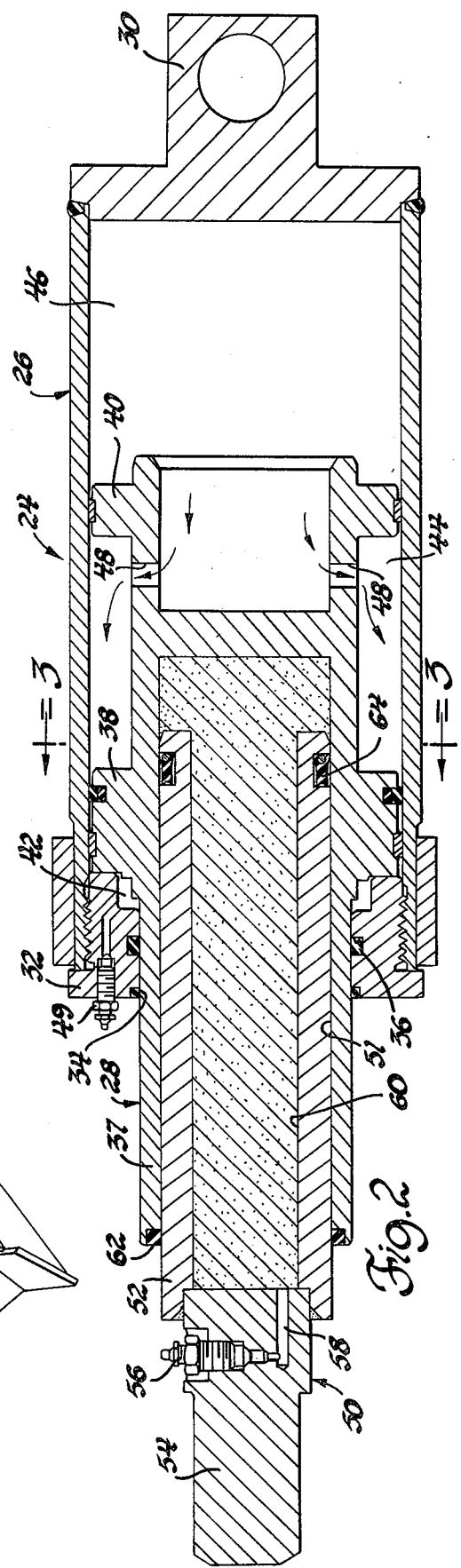
FIG. 2 is an enlarged sectional view showing the details of construction of the adjusting mechanism.

In order to accomplish the tensioning of the endless track 14 and to provide suitable resistance to recoil thereof, a forked yoke 22 is provided the forward end of which engages the idler wheel mounting structure. At its rear end, the yoke 22 is formed with a shaft having a bore which receives the forward end of a track tensioning mechanism 24 made in accordance with the invention and shown in FIG. 2.

In this regard, it will be noted that the track tensioning mechanism 24 comprises a cylinder member 26 and a relatively movable piston member 28. The base end of the cylinder member 26 is formed with an ear 30 which is adapted to be pivotally connected to the track frame 20 of the crawler tractor 10. The head end of the cylinder member 26 threadably receives a cap or collar 32 that carries an annular wiper seal 34 and an annular fluid seal 36 both of which circumferentially sealingly engage the outer diameter of the rod portion 37 of the piston member 28.

The piston member 28 is formed with a pair of axially spaced piston heads 38 and 40 that serve to divide the cylinder member into three chambers identified by the reference numerals 42, 44 and 46. Chambers 42 and 46 are variable volume chambers while chamber 44 is a fixed volume chamber. The chambers 44 and 46 are adapted to communicate with each other through radially extending passages 48 formed between the piston heads, and are adapted to be charged under pressure through a valve assembly (not shown) with an inert gas, such as nitrogen. The chamber 42 is adapted to be charged through a valve assembly 49 with an incompressible fluid such as grease and serves a function which will be more fully expalined hereinafter:

As alluded to hereinbefore, the piston member 28 includes the rod portion 37 which extends out of the head end of the cylinder member 26. The rod portion 37 is formed with an elongated cylindrical dead end bore 51 which receives a plunger 50 that is formed with a hollow sleeve 52 at one end and a solid stub shaft 54 at the other end. The free end of the stub shaft 54 is received within the aforementioned bore of the yoke 22 supporting the idler wheel 18. It will be noted that a valve assembly 56 is provided in the stub shaft 54 that communicates via a passage 58 with a closed variable volume chamber 60 formed by the hollow sleeve 52 and the bore 51 within the rod portion 37. The valve assembly 56 provides a means through which an incompressible fluid such as grease can be supplied to the chamber 60 under pressure. Annular seals 62 and 64 are respectively provided in the free end of the rod portion 37 and the inner end of the sleeve 52 for sealing the chamber 60 and preventing fluid from escaping therefrom.

When the track tensioning mechanism 24 is installed in the operating position on the tractor 10, the chambers 44 and 46 will be precharged with a nitrogen gas at a predetermined pressure so as to provide a desired spring force acting on piston member 28. Also, the chamber 60 in the rod portion 37 will be filled with sufficient grease to provide the desired tension on the track 14 while the chamber 42 may be provided with only that amount of grease so that the piston member 28 assumes the position shown in FIG. 2 at which time the piston head 38 contacts or nearly contacts the rear of the threaded cap 32 so as to limit forward movement of the piston member 28. Now, assuming that a certain amount of slack may occur in the track 14 while the tractor 10 is operating in the field, the track tensioning mechanism 24 can be adjusted in dimensional length so as to take up the slack by injecting grease under pressure through the valve assembly 56 into the chamber 60 causing the plunger 50 to move outwardly relative to the rod portion. Such adjustment can be made while maintaining the pressure of the nitrogen gas in chambers 44 and 46 constant. In addition, if for some reason the pressure of the nitrogen gas in the chambers 44 and 46 should decrease below an acceptable level or if it is desired to increase the pressure beyond the set level, grease under pressure can be injected into the chamber 42 thereby causing the piston member 28 to move to the right or rearwardly to increase the pressure of the nitrogen gas to the desired level. Such movement of the piston member 28 will result in a corresponding movement of the plunger 50 in the same direction which then can be compensated for by injecting grease into the chamber 60 through the valve assembly 56 so as to maintain the desired tension on the track 14.

Thus, from the above description, it should be apparent that an adjusting mechanism for track tensioning is provided having a self-contained accumulator that can be maintained at a predetermined pressure. In addition, the adjusting mechanism can be varied in length when the tractor is in the field by adding grease under pressure to appropriate chambers formed in the mechanism. Also, it should be noted that the piston member 28 is formed with axially spaced dual piston heads 38 and 40 so as to provide increased stability to the mechanism with the piston head 40 serving as a guide member to assure that the piston member 28 maintains proper alignment with the cylinder member 26 along the longitudinal center axis of the mechanism.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In a tracked vehicle, a track frame, an endless track, a driven sprocket engaging said track at one end thereof, an idler wheel engaging said track at the other end thereof, an adjustable track tensioning mechanism connected to said track frame at one end and to said idler wheel at the other end, said track tensioning mechanism comprising a cylinder member and a relatively movable piston member, said cylinder member having a base end and a head end, said piston member having a pair of axially spaced piston heads formed therewith for dividing said cylinder member into two variable volume chambers along its longitudinal length and for assuring that said piston member maintains longitudinal alignment with said cylinder member, a rod portion formed with said piston member normally extending out of the head end of said cylinder member, one of said chambers adjacent the base end of said cylinder member having a compressible fluid at a predetermined pressure so as to cushion track shocks, said rod portion having an elongated dead end bore formed therein along the longitudinal axis of said piston member, a plunger slidably received within said bore and forming a closed variable volume chamber therewith, an incompressible fluid located in said closed variable volume chamber in said rod portion, valve means carried by said plunger and adapted to direct an incompressible fluid under pressure into said closed variable volume chamber in the rod portion so as to cause said plunger to move outwardly relatively to said rod portion so as to adjust the tension of said endless track while maintaining the compressible fluid in said cylinder member at said predetermined pressure.

2. In a tracked vehicle, a track frame, an endless track, a driven sprocket engaging said track at one end thereof, an idler wheel engaging said track at the other end thereof, an adjustable track tensioning mechanism connected to said track frame at one end and to said idler wheel at the other end, said track tensioning mechanism comprising a cylinder member and a relatively movable piston member, said cylinder member having a base end and a head end, said piston member having a pair of axially spaced piston heads formed therewith for dividing said cylinder member into three chambers along its longitudinal length and for assuring that said piston member maintains longitudinal alignment with said cylinder member, one of said chambers having a fixed volume and the other two chambers having variable volumes and being on opposite sides of the fixed volume chamber and respectively located adjacent the head end and base end of the cylinder member, a rod portion formed with said piston member normally extending out of the head end of said cylinder member, said piston member having passage means for fluidly connecting the variable volume chamber adjacent the base end of said cylinder member with the fixed volume chamber, a compressible fluid at a predetermined pressure located in said variable volume chamber adjacent the base end of said cylinder member and in said fixed volume chamber so as to cushion track shocks upon rearward movement of the piston member, said rod portion having an elongated dead end cylindrical bore formed therein along the longitudinal axis of said piston member, a plunger having a hollow sleeve slidably received within said bore and forming a closed variable volume chamber therewith, an incompressible fluid located in said closed variable volume chamber in said rod portion, valve means carried by said plunger and adapted to direct an incompressible fluid under pressure into said closed variable volume chamber of said rod portion so as to cause said plunger to move outwardly relatively to said rod portion so as to adjust the tension of said endless track while maintaining the compressible fluid in said cylinder member at said predetermined pressure.

3. In a tracked vehicle, a track frame, an endless track, a driven sprocket engaging said track at one end thereof, an idler wheel engaging said track at the other end thereof, an adjustable track tensioning mechanism connected to said track frame at one end and to said idler wheel at the other end, said track tensioning mechanism comprising a cylinder member and a relatively movable piston member, said cylinder member having a base end and a head end, said piston member having a pair of axially spaced piston members formed therewith for dividing said cylinder member into a pair of variable volume chambers and a fixed volume chamber along its longitudinal length and for assuring that said piston member maintains longitudinal alignment with said cylinder member, said variable volume chambers being located on opposite sides of the fixed volume chamber adjacent the base end and the head end of the cylinder member, a rod portion formed with said piston member normally extending out of the head end of said cylinder member, the variable volume chamber adjacent the base end of said cylinder member communicating with said fixed volume chamber and having a compressible fluid at a predetermined pressure so as to cushion track shocks upon rearward movement of the piston member, said rod portion having an elongated dead end cylindrical bore formed therein along the longitudinal axis of said piston member, a plunger slidably received within said bore and forming a closed variable volume chamber therewith, an incompressible fluid located in said closed variable volume chamber in said rod portion, first valve means carried by said plunger and adapted to direct an incompressible fluid under pressure into said closed variable volume chamber so as to cause said plunger to move forwardly outwardly relatively to said rod portion so as to adjust the tension of said endless track, and second valve means carried by said cylinder member and adapted to direct an incompressible fluid into said variable volume chamber adjacent the head end of said cylinder member so as to move said piston member rearwardly and increase the pressure of said compressible fluid in said cylinder member.

* * * * *